(12) United States Patent
Miura et al.

(10) Patent No.: US 12,066,019 B2
(45) Date of Patent: Aug. 20, 2024

(54) ELECTRIC OIL PUMP AND CONTROL SYSTEM THEREOF

(71) Applicant: MIKUNI CORPORATION, Tokyo (JP)

(72) Inventors: Osamu Miura, Kanagawa (JP); Yasuaki Ota, Kanagawa (JP); Takashi Doi, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 154 days.

(21) Appl. No.: 17/870,788

(22) Filed: Jul. 21, 2022

(65) Prior Publication Data

US 2023/0040215 A1 Feb. 9, 2023

(30) Foreign Application Priority Data

Aug. 7, 2021 (JP) ................. 2021-130384

(51) Int. Cl.
*F04B 49/10* (2006.01)
*F04B 17/03* (2006.01)
*F04B 49/06* (2006.01)
*F16H 57/04* (2010.01)

(52) U.S. Cl.
CPC ............ *F04B 49/10* (2013.01); *F04B 17/03* (2013.01); *F04B 49/06* (2013.01); *F16H 57/0436* (2013.01); *F04B 2203/0201* (2013.01); *F04B 2203/0209* (2013.01); *F04B 2205/10* (2013.01)

(58) Field of Classification Search
CPC .......... F04B 49/10; F04B 17/03; F04B 49/06; F04B 2203/0201; F04B 2203/0209; F04B 2205/10; F16H 57/0436
See application file for complete search history.

(56) References Cited

U.S. PATENT DOCUMENTS

2022/0135092 A1* 5/2022 Herden .................. F04B 49/06 701/19
2023/0246582 A1* 8/2023 Ishijima .............. H02P 29/0027 417/32

FOREIGN PATENT DOCUMENTS

JP 2020200900 12/2020

* cited by examiner

*Primary Examiner* — Bryan M Lettman
(74) *Attorney, Agent, or Firm* — JCIPRNET (57) ABSTRACT

An electric oil pump includes a pump unit, rotating to make oil flow, a motor driving the pump unit, a control unit exerting driving control on the motor, and a housing accommodating the pump unit, the motor, and the motor control unit. In the electric oil pump, the motor control unit directly receives detection information of a temperature sensor detecting a temperature of the oil and exerts driving control on the motor based on the detection information.

5 Claims, 10 Drawing Sheets

| Control mode | Driving method | Command | Oil temperature (T) |
|---|---|---|---|
| Regular temperature driving mode | Synchronized driving | Rotation number | $A < T$ |
| Low temperature driving mode | Synchronized driving | Duty | $B \leq T \leq A$ |
| Extremely low temperature driving mode | Step driving (forced commutation) | Duty (fixed rotation number) | $T < B$ |

ELECTRIC OIL PUMP AND CONTROL SYSTEM THEREOF

CROSS-REFERENCE TO RELATED APPLICATION

This application claims the priority benefit of Japan application serial no. 2021-130384, filed on Aug. 7, 2021. The entirety of the above-mentioned patent application is hereby incorporated by reference herein and made a part of this specification.

BACKGROUND

Technical Field

The invention relates to an electric oil pump used in the supply of hydraulic oil or cooling oil in a transmission or an apparatus cooled off by oil and mounted to a vehicle, etc., and a control system of the electric oil pump.

Description of Related Art

A conventional electric oil pump control system (see Patent Document 1, for example) including an electric oil motor, a temperature sensor, and a vehicle control mechanism is known. The electric oil motor includes a pump unit supplying oil to a transmission mounted to a vehicle, a motor driving the pump unit, and a driving device configured as a subordinate controller exerting driving control on the motor. The temperature sensor measures the temperature of oil stored in an oil tank. The vehicle control mechanism is configured as a superordinate controller and mounted on the vehicle side.

In the control system, a detection signal of the temperature sensor is transmitted to the superordinate controller (vehicle control mechanism) on the vehicle side via a wiring, a command signal is output from the superordinate controller to the subordinate controller (driving device) via a communication line, and, based on the command signal, the subordinate controller exerts driving control on the motor. Therefore, when the wiring connecting the temperature sensor and the superordinate controller or the communication line connecting the superordinate controller and the subordinate controller is disconnected, there is a concern that the pump operation stops or a desired oil supply amount is not secured.

PRIOR ART DOCUMENT

Patent Document

[Patent Document 1] Japanese Laid-Open No. 2020-200900

SUMMARY

An electric oil pump according to an aspect of the invention includes: a pump unit, rotating to make oil flow; a motor, driving the pump unit; a motor control unit, exerting driving control on the motor; and a housing, accommodating the pump unit, the motor, and the motor control unit. The electric oil pump is configured so the motor control unit directly receives detection information of a temperature sensor detecting a temperature of the oil and exerts driving control on the motor based on the detection information.

In the electric oil pump, it may also be configured that the temperature sensor is disposed inside the housing to detect the temperature of the oil in a vicinity region of the pump unit.

In the electric oil pump, it may also be configured that the motor control unit includes a storage part. The storage part stores information of multiple control modes set in correspondence with the detection information of the temperature sensor and command values corresponding to the control modes In the electric oil pump, it may also be configured that the command value includes a target current and a target rotation number corresponding to the detection information of the temperature sensor.

In the electric oil pump, it may also be configured that the motor control unit directly receives a feedback signal of an actually measured current of the motor and an actually measured rotation number of the motor and exerts driving control on the motor based on the feedback signal.

A control system of an electric oil pump according to a first aspect of the invention includes: an electric oil pump, including: a pump unit, rotating to make oil flow; a motor, driving the pump unit; a motor control unit, exerting driving control on the motor; and a housing, accommodating the pump unit, the motor, and the motor control unit; and a superordinate control unit, mounted to an application target to which the electric oil pump is applied and communicating with the motor control unit. The control system is configured that the motor control unit is started based on a start command of the superordinate control unit, directly receives detection information of a temperature sensor detecting a temperature of the oil, and exerts driving control on the motor based on the detection information In the control system according to the first perspective, it may also be configured that the temperature sensor is disposed inside the housing to detect the temperature of the oil in a vicinity region of the pump unit.

In the control system according to the first perspective, it may also be configured that the motor control unit includes a storage part. The storage part stores information of multiple control modes set in correspondence with the detection information of the temperature sensor and command values corresponding to the control modes In the control system according to the first perspective, it may also be configured that the command value includes a target current and a target rotation number corresponding to the detection information of the temperature sensor.

In the control system according to the first perspective, it may also be configured that the motor control unit directly receives a feedback signal of an actually measured current of the motor and an actually measured rotation number of the motor and exerts driving control on the motor based on the feedback signal.

In the control system according to the first perspective, it may also be configured that when the actually measured rotation number of the motor is greater than the target rotation number and the actually measured current of the motor is less than the target current, the motor control unit assumes that the pump unit is in an idling state and outputs an idling detection signal to the superordinate control unit.

A control system of an electric oil pump according to a second aspect of the invention includes: an electric oil pump, including: a pump unit, rotating to make oil flow; a motor, driving the pump unit; a motor control unit, exerting driving control on the motor; and a housing, accommodating the pump unit, the motor, and the motor control unit; and a superordinate control unit, mounted to an application target to which the electric oil pump is applied, directly receiving detection information of a temperature sensor detecting a temperature of the oil, and communicating with the motor control unit to transmit a control command to the motor control unit based on the detection information. The control system is configured so the motor control unit includes a communication switching part that switches a communication circuit to directly receive the detection information of the temperature sensor when communication with the superordinate control unit is cut off, directly receives the detection information of the temperature sensor based on a switching signal of the communication switching part, and exerts driving control on the motor based on the detection information In the control system according to the second perspective, it may also be configured that the temperature sensor is disposed inside the housing to detect the temperature of the oil in a vicinity region of the pump unit.

In the control system according to the second perspective, it may also be configured that the motor control unit includes a storage part. The storage part stores information of multiple control modes set in correspondence with the detection information of the temperature sensor and command values corresponding to the control modes In the control system according to the second perspective, it may also be configured that the command value includes a target current and a target rotation number corresponding to the detection information of the temperature sensor.

In the control system according to the second perspective, it may also be configured that the motor control unit directly receives a feedback signal of an actually measured current of the motor and an actually measured rotation number of the motor and exerts driving control on the motor based on the feedback signal.

DESCRIPTION OF THE EMBODIMENTS

The invention provides an electric oil pump and a control system thereof capable of exerting independent pump driving control or capable of exerting pump driving control even if a command signal from a superordinate controller is interrupted.

According to the electric oil pump and the control system thereof according to the above configurations, by directly receiving the detection information of the temperature sensor detecting the temperature of the oil, the electric oil pump can independently exert pump driving control on its own, or can exert pump driving control even if the command signal from the superordinate controller is interrupted, and can supply a desired amount of oil.

In the following, the embodiments of the invention will be described with reference to the drawings.

Figure 1:
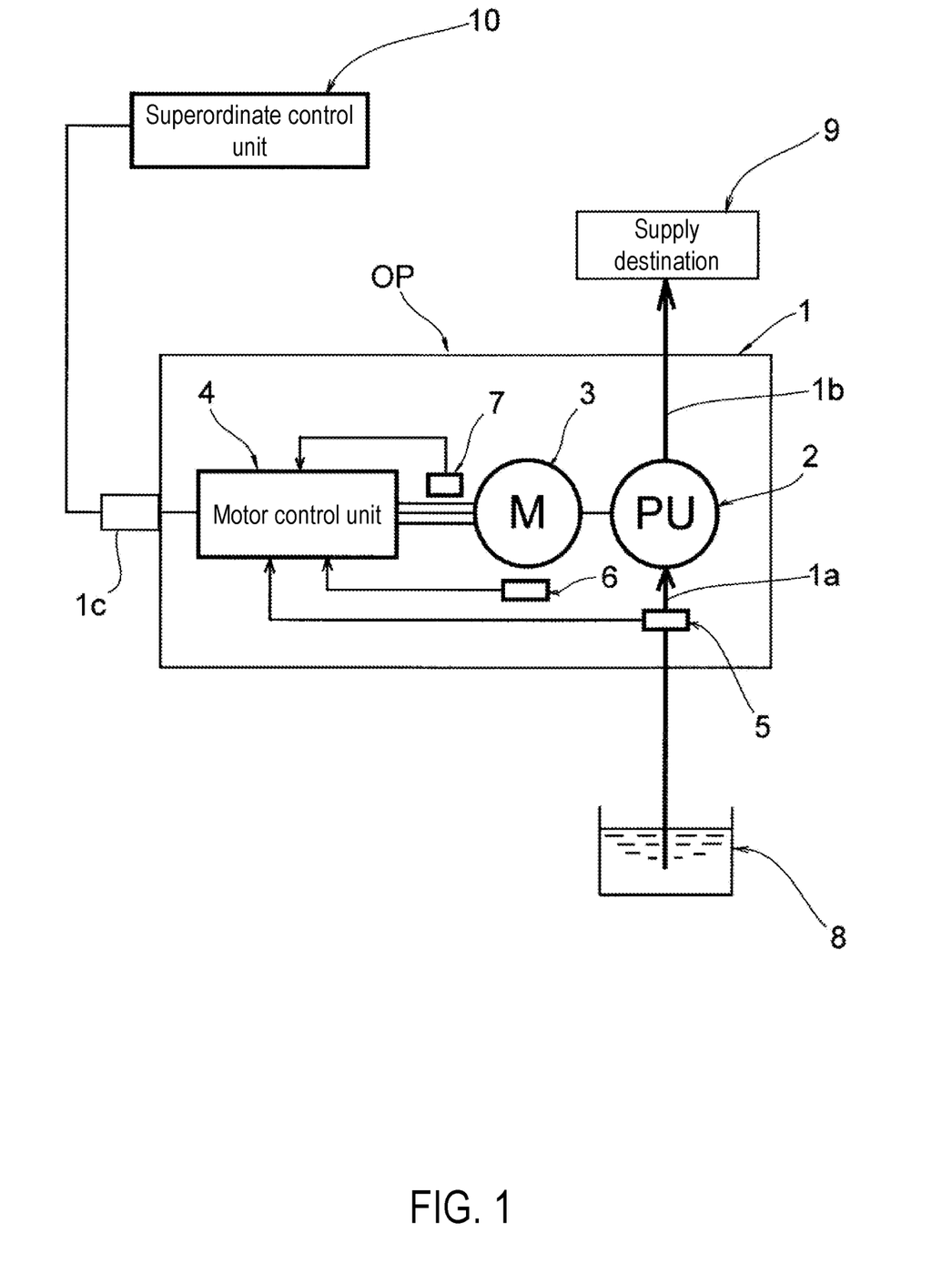
FIG. 1 is a schematic view illustrating a configuration of a control system of an electric oil pump according to an embodiment of the invention.

An electric oil pump OP according to an embodiment is suitable for an application target such as a transmission of a vehicle, and supplies oil. As shown in FIG. 1, the electric oil pump OP includes a housing 1, a pump unit 2, a motor 3, a motor control unit 4, a temperature sensor 5, a rotation position detection part 6, and a current detection part 7.

In addition, in a state in which the electric oil pump OP is applied to an application target, a control system of the electric oil pump according to an embodiment includes the electric oil pump OP and a superordinate control unit 10 mounted to the application target.

The housing 1 is formed by a metal material, such as aluminum, or a resin material. As shown in FIG. 1, the housing 1 includes an accommodation chamber respectively accommodating a motor control unit 4 together with a pump unit 2 and a motor 3, an installation part to be installed to the application target, a suction passage 1a, a discharge passage 1b, and a connector 1c.

The suction passage 1a is a passage that is in communication with the accommodation chamber of the pump unit 2 and sucks oil from an oil tank 8 of the application target.

The discharge passage 1b is a passage through which oil pressurized by the pump unit 2 is discharged to a supply destination 9 of the application target.

The connector 1c connects a wiring extending from the motor control unit 4 and a wiring extending from the superordinate control unit 10 mounted on the application target.

The pump unit 2 rotates to suck, pressurize, and discharge the oil to make the oil flow, and is a trochoid type pump unit including an inner rotor and an outer rotor, for example.

The motor 3, for example, is a three-phase brushless DC motor, and rotation-drives the pump unit 2 through driving control by the motor control unit 4.

The temperature sensor 5 is, for example, a thermistor, and is disposed inside the housing 1 to detect the temperature of the oil flowing through the sucking passage 1a of the housing 1.

In this way, since the temperature sensor 5 is disposed in the housing 1 of the electric oil pump OP, the temperature of the oil flowing through the vicinity of the pump unit 2 can be detected with high accuracy. Therefore, at the time of exerting driving control on the motor 3 driving the pump unit 2, the driving control can be exerted on the motor 3 with high accuracy based on the highly accurate detection information relating to the oil.

In addition, since the temperature sensor 5 is disposed inside the housing 1, oil leakage due to disconnection, which is a concern in a configuration disposed in an oil tank and requiring a wiring, or deterioration of a seal member in the mounting part of the temperature sensor, as in the conventional art, can be prevented.

The rotation position detection part 6 detects a rotation angle position of a rotor included in the motor 3, and includes three Hall elements disposed in a region accommodating the motor 3 of the housing 1.

The current detection part 7 detects a current flowing through coils of the motor 3, and outputs a detected current as an actually measured current. The current detection part 7 is formed by an electric circuit including a resistor, an operational amplifier, etc.

The motor control unit 4 is configured as a subordinate controller including various electronic components and circuits forming a processor, a storage part, a counter, a communication part communicating with the superordinate control unit 10, an input/output interface, etc.

The counter counts and increments the number of times of steps repeated in a control sequence.

Figure 2:
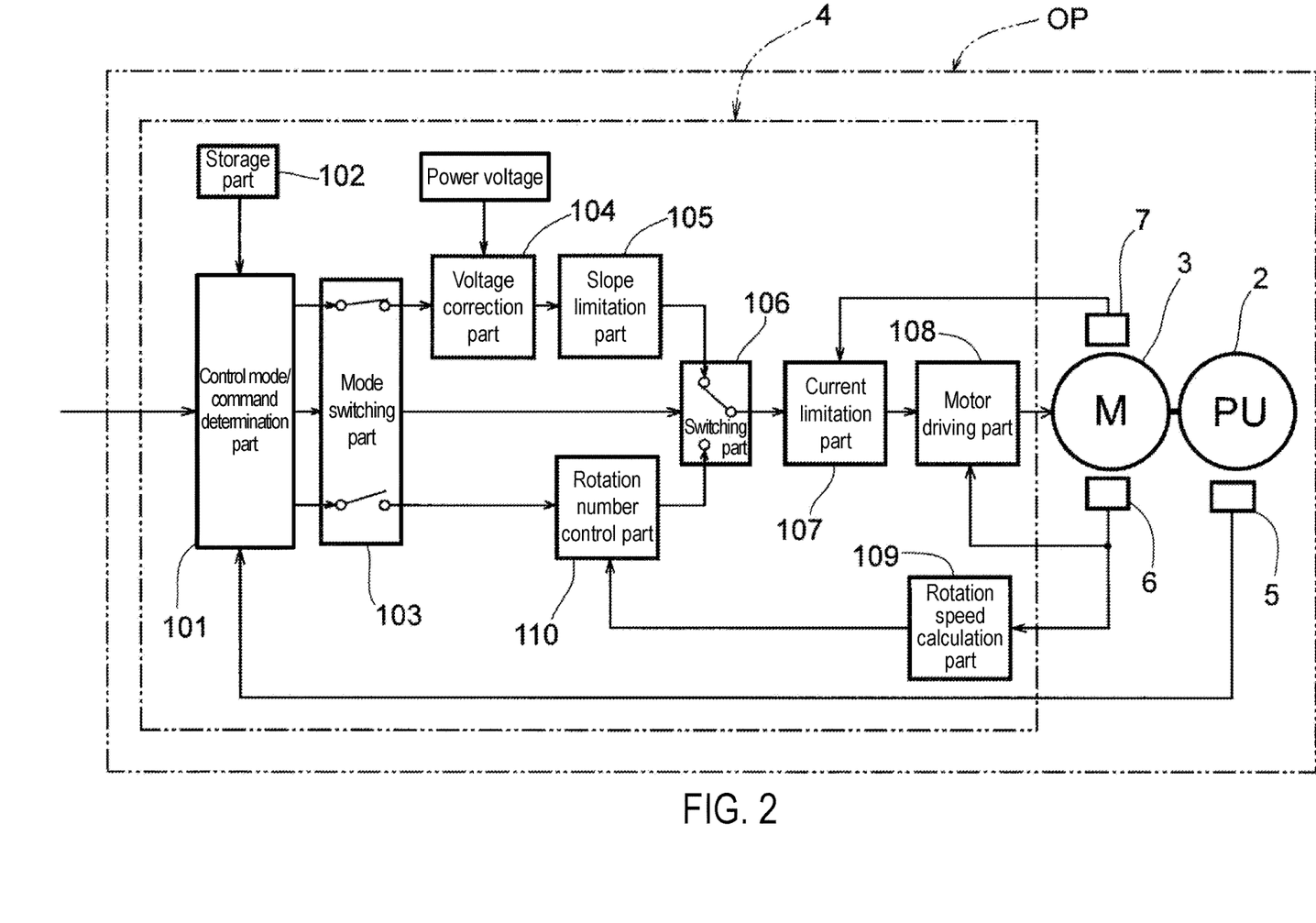
FIG. 2 is a block diagram illustrating a motor control unit included in the electric oil pump according to the embodiment.

As shown in FIG. 2, the motor control unit 4 includes a control mode/command determination part 101, a storage part 102, a mode switching part 103, a voltage correction part 104, a slope limitation part 105, a switching part 106, a current limitation part 107, a motor driving part 108, a rotation speed calculation part 109, and a rotation number control part 110.

The control mode/command determination part 101 determines a control mode controlling the motor 3 based on a temperature T (° C.) of the oil as the detection information detected by the temperature sensor 5, and determines and outputs a command value corresponding to the control mode.

That is, based on the detection information (temperature T) of the temperature sensor 5, the control mode/command determination part 101 selects a control mode, among multiple control modes, corresponding to the temperature T of the oil with reference to the information stored in advance in the storage part 102, determines the command value corresponding to the selected control mode, and outputs a signal relating to such information to the mode switching part 103.

Figure 3:
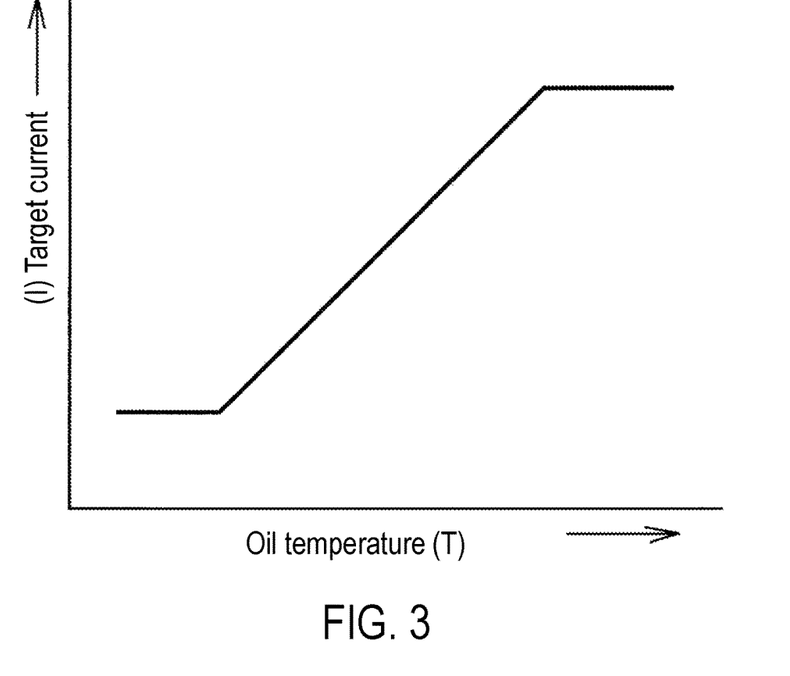
FIG. 3 is a graph illustrating a map which indicates a relationship of a target current with respect to an oil temperature, as a command value stored in a storage part of the motor control unit in the electric oil pump according to the embodiment.
Figure 4:
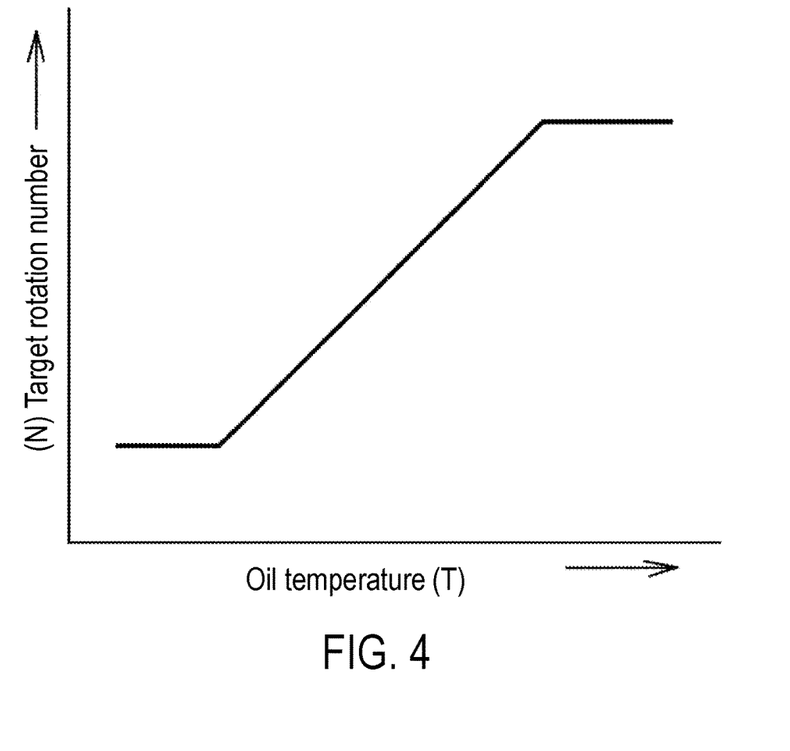
FIG. 4 is a graph illustrating a map which indicates a relationship of a target rotation number with respect to the oil temperature, as a command value stored in the storage part of the motor control unit in the electric oil pump according to the embodiment.

The storage part 102 stores table information of the control modes corresponding to the detection information of the temperature sensor 5 and map information of the command values as well as other information, and is formed by a memory element such as a ROM, a RAM, etc. The map information of the command values stored in the storage part 102 is data based on a graph indicating a relationship between the temperature (T) of the oil and a target current (I) transmitted to the motor 3 and data based on a graph indicating a relationship between the temperature (T) of the oil and a target rotation number (N) of the motor 3, as shown in FIGS. 3 and 4.

Figure 5:
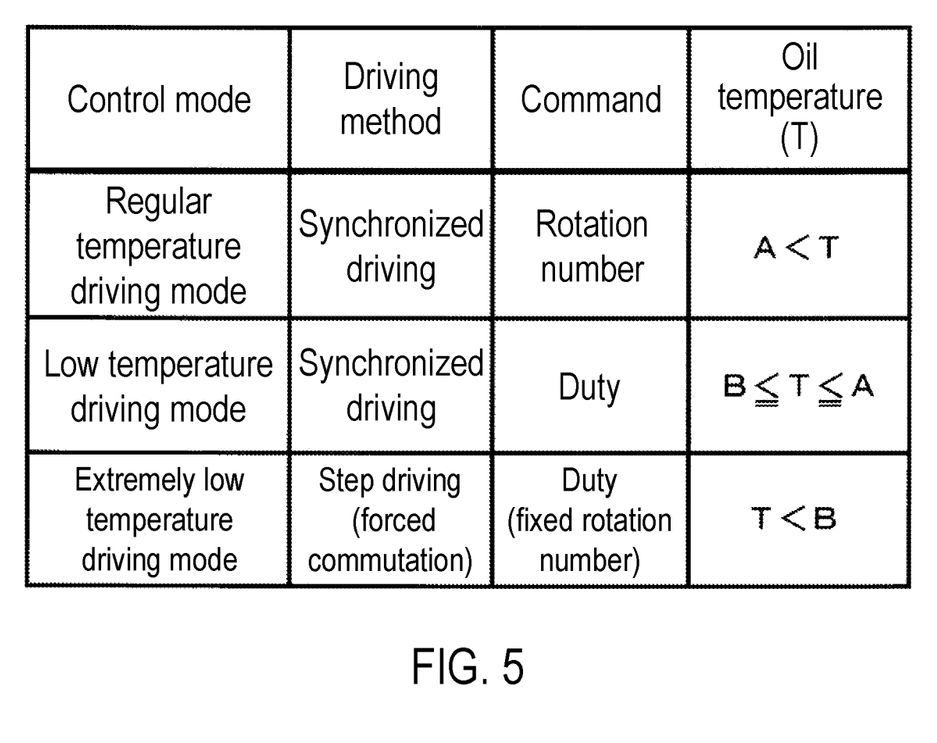
FIG. 5 is a table diagram illustrating multiple control modes set in correspondence with the oil temperature in the electric oil pump according to the embodiment.

In addition, the control modes include a regular temperature driving mode corresponding to the time when the temperature T of the oil is higher than a temperature A (° C.) (i.e., T>A), a low temperature driving mode when the temperature T of the oil is in a range of the temperature A to a temperature B (° C.), and an extremely low temperature driving mode corresponding to the time when the temperature T of the oil is lower than the temperature B (i.e., T<B). It is noted that hysteresis may also be provided for the switching temperature of each driving mode.

In the regular temperature driving mode, synchronized driving is applied as a driving method, and a target rotation number, that is, a command rotation number, is set as the command.

In the low temperature driving mode, synchronized driving is applied as a driving method, and a command duty as a duty corresponding to a target current is set as the command.

In the extremely low temperature driving mode, step driving (forced commutation) is applied as a driving method, and a command duty (fixed rotation number) as a duty corresponding to the target current is set as the command.

That is, the storage part 102 stores the information of multiple control modes set in correspondence with the detection information of the temperature sensor 5 and command values corresponding to the control modes.

In addition, the command value includes the target current or the target rotation number corresponding to the detection information of the temperature sensor 5 in correspondence with the control mode.

The mode switching part 103 performs a switching operation which switches circuits corresponding to the control modes based on the output signal of the control mode/ command determination unit 101.

That is, in the case where the low temperature driving mode and the extremely low temperature driving mode are selected as the control mode in the control mode/command determination part 101, the mode switching part 103 turns on a switch connected with the voltage correction part 104 and outputs the command duty to the voltage correction part 104.

Meanwhile, in the case where the regular temperature driving mode is selected as the control mode in the control mode/command determination part 101, the mode switching part 103 turns on a switch connected with the rotation number control part 110 and outputs the command rotation number to the rotation number control part 110.

The voltage correction part 104 adopts the command duty output from the mode switching part 103 as the input signal, corrects the command duty in accordance with the fluctuation of a power voltage (battery voltage), and outputs the corrected duty to the slope limitation part 105 as a target duty. For example, when the power voltage exceeds a predetermined value, the command duty is corrected to be reduced, when the power voltage drops below the predetermined value, the command duty is corrected to be increased, and the corrected command duty is output to the slope limitation part 105 as the target duty.

The slope limitation part 105 refers to the target duty as the input signal output from the voltage correction part 104 and an operation duty, exerts limitation so that a change degree (slope) at the time of changing from the operation duty to the target duty does not reach or exceed a predetermined level, and outputs a limited duty to the switching part 106 as a driving duty. In this way, by exerting the slope limitation, a step-out of the motor 3, etc., can be prevented.

The switching part 106 is linked with the switching operation of the mode switching part 103, and performs a switching operation which switches to the circuit corresponding to the control mode based on the switching signal of the mode switching part 103.

That is, in the case where the low temperature driving mode and the extremely low temperature driving mode are selected as the control mode in the control mode/command determination part 101, the switching part 106 turns on the switch connecting the slope limitation part 105 with the current limitation part 107 and outputs the driving duty of the slope limitation part 105 to the current limitation part 107.

Meanwhile, in the case where the regular temperature driving mode is selected as the control mode in the control mode/command determination part 101, the switching part 106 turns on the switch connecting the rotation number control part 110 to the current limitation part 107 and outputs the driving duty output from the rotation number control part 110 to the current limitation part 107.

The current limitation part 107 sets, as the driving duty, a duty less than or equal to a limit value in which a current is set in advance based on the driving duty as the input signal input from the switching part 106 and the actually measured current as a feedback signal flowing through the coils of the motor 3 and detected by the current detection part 7. Here, the limit value is a limit value of a current set so that an electronic component, etc., is not damaged due to an overcurrent flowing through.

The motor driving part 108 includes an inverter circuit, etc., for driving the motor 3, and, based on the driving duty as the input signal output from the current limitation part 107 or based on phase information output from the rotation position detection part 6 as the feedback signal, switches ONs and OFFs of six switching elements in accordance with the direction of the current flowing through the three-phase coils depending on the rotation position of the rotor, and converts the DC voltage into three-phase voltages to output the three-phase voltages of a PWM signal to the motor 3, thereby driving the motor 3.

Based on the information of the rotation angle position of the rotor as the feedback signal output from the rotation position detection part 6, the rotation speed calculation part 109 calculates the rotation speed of the rotor and the rotation number of the rotor, and outputs the calculated rotation number to the rotation speed control part 110 as an actually measured rotation number of the motor 3.

The rotation number control part 110 calculates a rotation number difference between the command rotation number as the input signal output from the motor switching part 103 and the actually measured rotation number as the feedback signal output from the rotation speed calculation part 109, calculates a driving voltage that reduces the rotation number difference, and outputs, as the driving duty, a duty for the driving voltage to the switching part 106.

For example, if the actually measured rotation number is less than the command rotation number, the rotation speed control part 110 sets a duty which increases the driving voltage, if the actually measured rotation number is greater than the command rotation number, the rotation number control part 110 sets a duty that reduces the driving voltage, and the rotation speed control part 110 sets the duty as the driving duty and outputs the duty to the switching part 106.

Then, the control operation of the electric oil pump OP with such configuration will be described based on the flowchart shown in FIG. 6. The flowchart shown in FIG. 6 serves to schematically describe the overall operation.

In the case where the electric oil pump OP is applied to an application target, the superordinate control unit 10 is communicatably connected with the motor control unit 4 of the electric oil pump OP via the connector 1c. Then, the motor control unit 4 starts based on the start command (a command signal of power ON) of the superordinate control unit 10. Then, the motor control unit 4 handles the overall control operation based on the detection information and the map information, etc., stored in advance in the storage part 102.

Firstly, in Step S1, the temperature of the oil is detected by the temperature sensor 5. Then, in Step S2, the control mode is determined based on the detection information of the detected temperature. That is, when the temperature T of the oil is higher than the temperature A set in advance, the regular temperature driving mode is selected, when the temperature T of the oil is in the range of the temperature A to the temperature B set in advance, the low temperature driving mode is selected, and when the temperature T of the oil is lower than the temperature B, the extremely low temperature mode is selected.

Then, in Step S3, a command signal corresponding to the control mode determined in Step S2 is determined. That is, in the case where the low temperature driving mode or the extremely low temperature driving mode is selected, a target current (a command duty corresponding to the target current) is determined from the map information stored in the storage part 102. Meanwhile, in the case where the regular temperature driving mode is selected, the target rotation number is determined from the map information stored in the storage part 102. Then, in Step S4, the voltage is corrected, and in Step S5, the driving duty is determined.

Then, in Step 6, the motor 3 is driven based on the driving duty determined in Step S5. Then, in Step S7, in the case of the low temperature driving mode and the extremely low temperature driving mode, whether the target current and the actually measured current are substantially equal to each other is determined, and in the case of the regular temperature driving mode, whether the target rotation number and the actually measured rotation number are substantially equal to each other is determined. That is, whether the target value and the actually measured value are substantially equal to each other is determined.

Then, in the case where it is determined that the target value and the actually measured value are not substantially equal to each other (NO), the flow returns to Step S1, and the sequence of Step S1 to Step S7 is repeated.

Meanwhile, in the case where it is determined that the target value and the actually measured value are substantially equal to each other (YES), the motor 3 rotation-drives the pump unit 2, that is, pump driving continues.

According to the electric oil pump with the above configuration and the control system thereof, the superordinate control unit 10 only transmits the start signal to the motor control unit 4, and the motor control unit 4 performs the driving control of the motor 3.

That is, instead of receiving via the superordinate control unit 10, the motor control unit 4 built in the electric oil pump OP directly receives the detection information of the temperature sensor 5, and exerts driving control on the motor 3 based on the received information. Therefore, the motor control unit 4 can stabilize the motor 3 and exert driving control irrelevant of the signal transmitted from the superordinate control unit 10, and can supply a desired amount of oil.

According to the electric oil pump OP with the above configuration, the temperature sensor 5 is disposed inside the housing 1 of the electric oil pump OP. Therefore, the temperature of the oil flowing through the vicinity of the pump unit 2 can be accurately detected. When the motor 3 driving the pump unit 2 is under driving control, the motor 3 can be subjected to driving control with high accuracy based on the highly accurate detection information (temperature information). In addition, since the temperature sensor 5 is disposed inside the housing 1, a disconnection, etc., can be prevented.

According to the electric oil pump OP with the above configuration, the motor control unit 4 includes the storage part 102 storing the information of the control modes (regular temperature driving mode, low temperature driving mode, extremely low temperature driving mode) set in correspondence with the detection information of the temperature sensor 5 and the command values corresponding to the control modes, that is, the target currents and the target rotation numbers corresponding to the detection information of the temperature sensor 5. Therefore, in the electric oil pump OP, the information stored in the storage part 102 can be changed in accordance with the specification, and the electric oil pump OP in accordance with various application targets can be provided.

Figure 7:
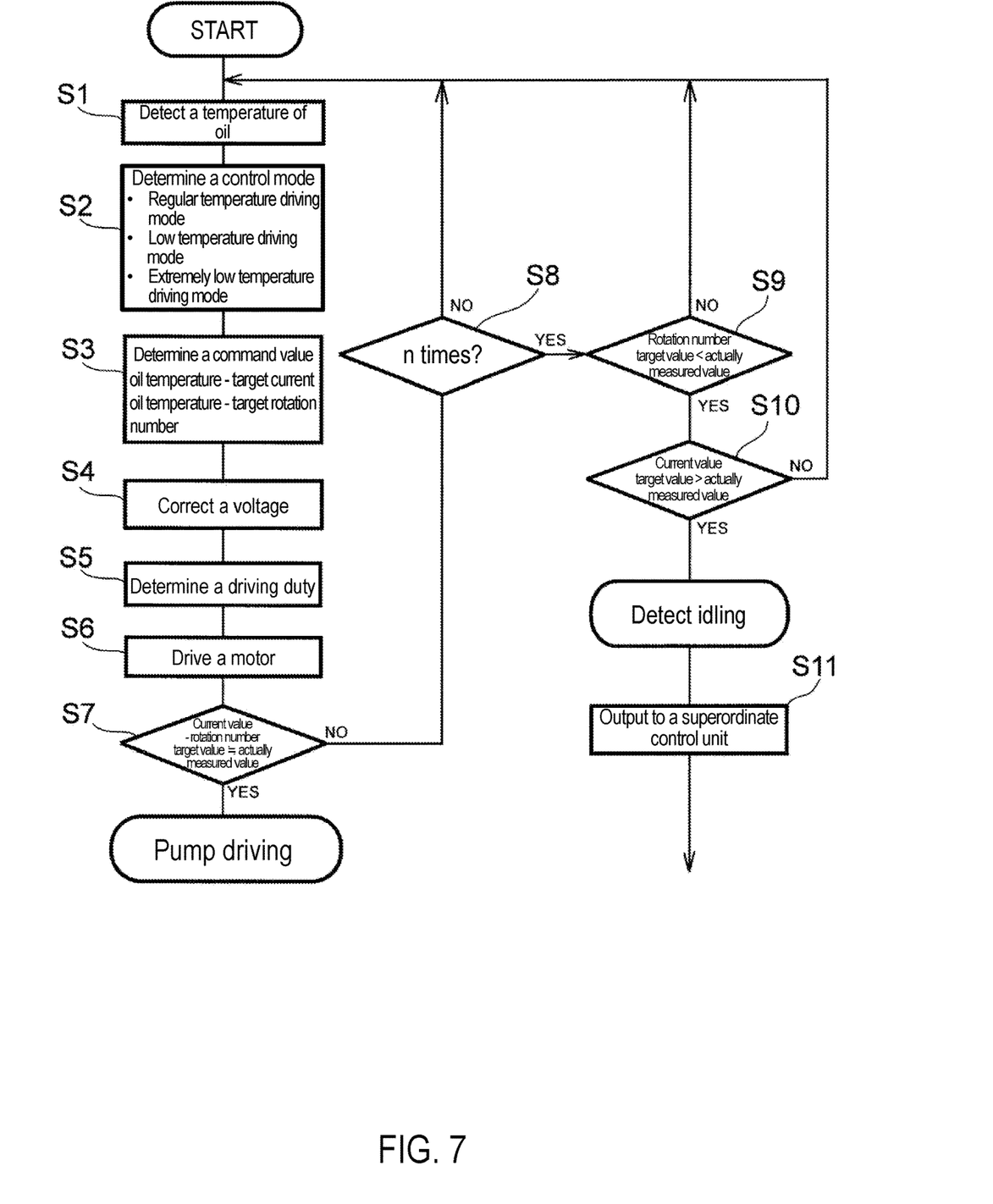
FIG. 7 is a flowchart illustrating another control sequence relating to idling detection of a pump unit in the electric oil pump according to the embodiment.

FIG. 7 is a flowchart illustrating other control operations in the control system of the electric oil pump, in which the description of the control operations same as those of the above embodiment will be omitted.

In the control operations, when the actually measured rotation number of the motor 3 is greater than the target rotation number and the actually measured current of the motor 3 is less than the target current, the pump unit 2 is assumed to be in an idling state, and the motor control unit 4 outputs an idling detection signal to the superordinate control unit 10.

Specifically, as shown in FIG. 7, in Step S7, in the case of the low temperature driving mode and the extremely low temperature driving mode, whether the target current and the actually measured current are substantially equal to each other is determined, and in the case of the regular temperature driving mode, whether the target rotation number and the actually measured rotation number are substantially equal to each other is determined. That is, whether the target value and the actually measured value are substantially equal to each other is determined.

Then, in the case where it is determined that the target value and the actually measured value are not substantially equal to each other (NO), the flow proceed to Step S8.

In Step S8, whether the number of times of being determined as NO in Step S7 is n is determined.

Then, when it is determined that the number of times has not reached n, the counter increments, the flow returns to Step S1, and the sequence of Step S1 to Step S7 is repeated. Meanwhile, in Step S8, when it is determined that the number of times is n times, the flow proceed to Step S9.

Then, in Step S9, whether the actually measured rotation number of the motor 3 is greater than the target rotation number is determined. Then, in the case where it is determined that the actually measured rotation number is not greater than the target rotation number (NO), the flow returns to Step S1, and the sequence of Step S1 to Step S7 is repeated. Meanwhile, when it is determined that the actually measured rotation number of the motor S3 is greater than the target rotation number (YES), the flow proceed to Step S10.

Then, in Step S10, whether the actually measured current of the motor 3 is less than the target current is determined. In the case where it is determined that the actually measured current is not less than the target current (NO), the flow returns to Step S1, and the sequence of Step S1 to Step S7 is repeated. Meanwhile, in the case where it is determined that the actually measured current of the motor 3 is less than the target current (YES), it is determined that idling is detected, and, in Step S11, the idling detection signal is output to the superordinate control unit 10.

Accordingly, the superordinate control unit 10 can set the pump unit 2 to the idling state and provide information notifying that the pump unit 2 is in the idling state. Also, where necessary, the superordinate control unit 10 can stop the overall operation of the application target based on the idling detection signal.

FIGS. 8 to 11 illustrate another embodiment of a control system of an electric oil pump according to the invention, where the configuration same as that of the above embodiment is labeled with the same reference symbol, and the description thereof is omitted.

Figure 8:
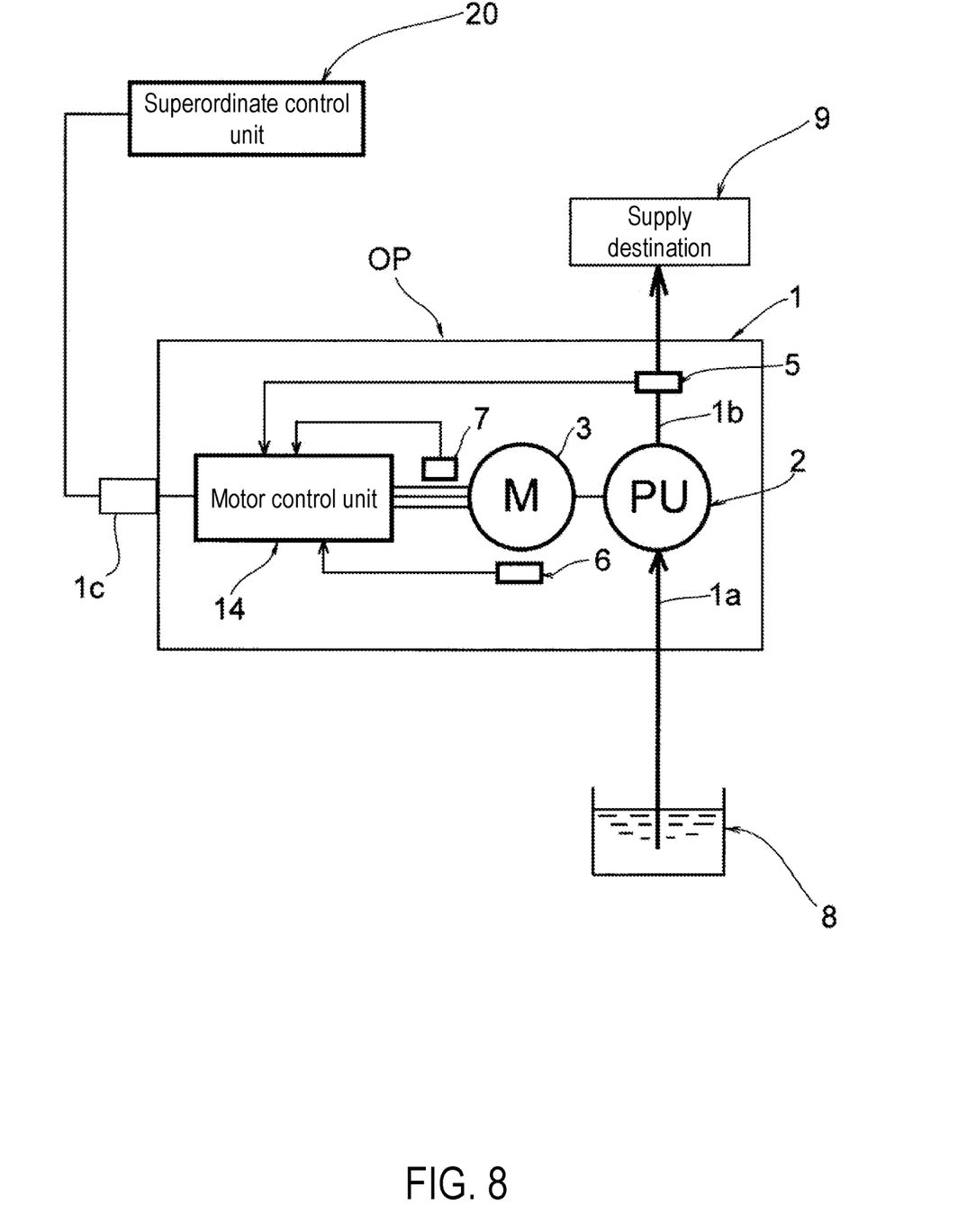
FIG. 8 is a schematic view illustrating a configuration of an electric oil pump and a control system thereof according to another embodiment of the invention.

The electric oil pump OP according to the embodiment is suitable for an application target such as a transmission of a vehicle, and supplies oil. As shown in FIG. 8, the electric oil pump OP includes the housing 1, the pump unit 2, the motor 3, a motor control unit 14, the temperature sensor 5, the rotation position detection part 6, and the current detection part 7.

In addition, in a state in which the electric oil pump OP is applied to an application target, the control system of the electric oil pump according to the embodiment includes the electric oil pump OP and a superordinate control unit 20 mounted to the application target.

In the electric oil pump OP according to the embodiment, the temperature sensor 5 is disposed inside the housing 1 to detect the temperature of the oil flowing through the discharge passage 1b of the housing 1. In this way, since the temperature sensor 5 is disposed in the housing 1 of the electric oil pump OP, like the previous embodiment, the temperature of the oil flowing through the vicinity of the pump unit 2 can be detected with high accuracy.

Therefore, at the time of exerting driving control on the motor 3 driving the pump unit 2, the driving control can be exerted on the motor 3 with high accuracy based on the highly accurate detection information relating to the oil.

In addition, since the temperature sensor 5 is disposed inside the housing 1, a disconnection or oil leakage, etc., which is a concern in a configuration disposed in an oil tank and requiring a wiring as in the conventional art, can be prevented.

The superordinate control unit 20 is mounted to the application target to which the electric oil pump OP is applied and communicatably connected with the motor control unit 14 to directly receive the detection information of the temperature sensor 5 detecting the temperature of the oil and transmit control information to the motor control unit 14 based on the detection information. It is noted that the superordinate control unit 20 may also be configured to receive the detection information of the temperature sensor 5 via the electric oil pump OP.

In addition, the superordinate control unit 20 stores the information of the control modes set in correspondence with the detection information of the temperature sensor 5 and the command values corresponding to the control modes. Like the above, the information of the control modes is information relating to the regular temperature driving mode, the low temperature driving mode, and the extremely low temperature driving mode.

Figure 9:
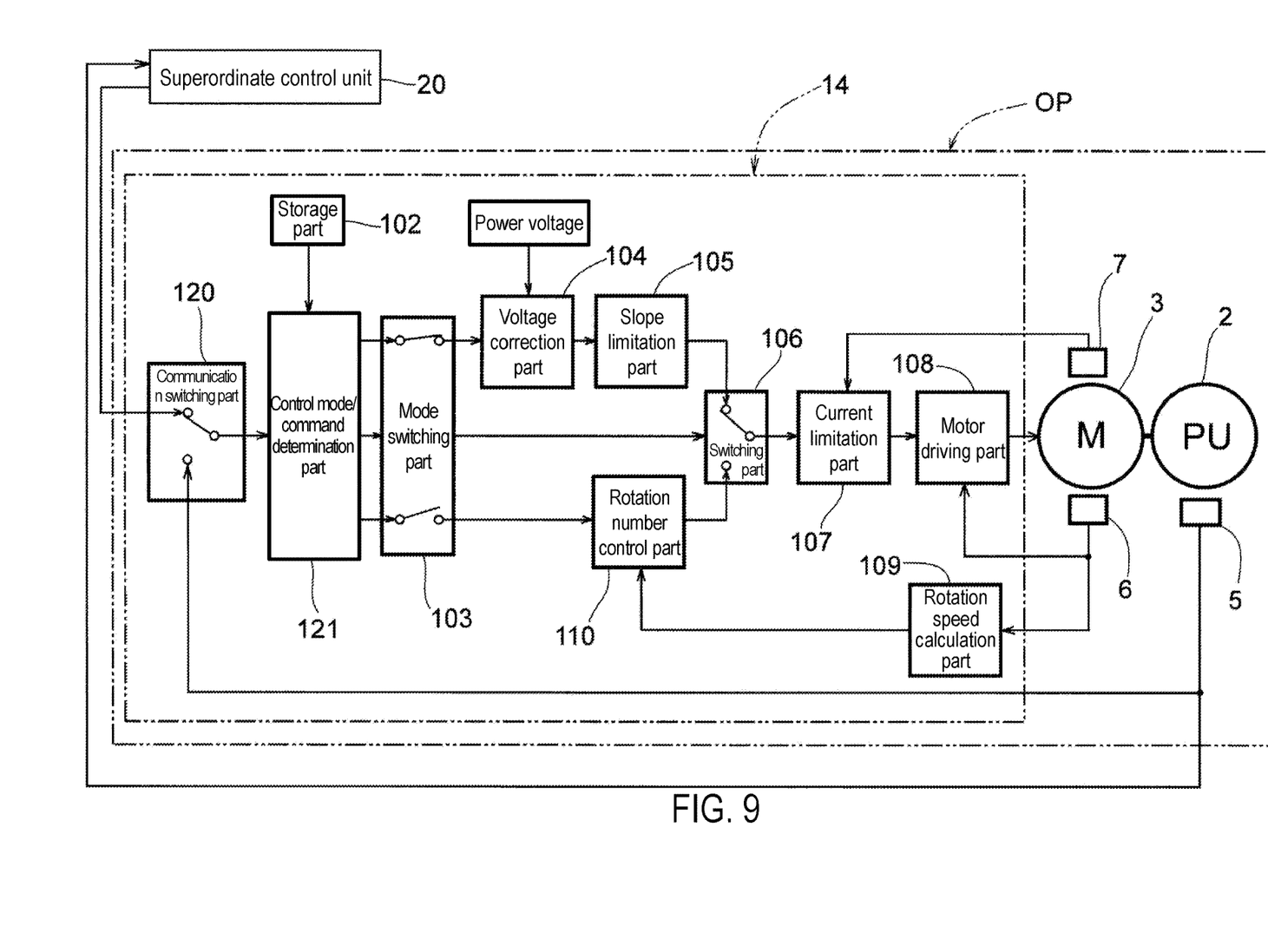
FIG. 9 is a block diagram of the control system of the electric oil pump according to the another embodiment.

Then, based on the detection information (temperature T) of the temperature sensor 5, the superordinate control unit 20 selects a control mode, among the control modes, corresponding to the temperature T of the oil with reference to the information stored in advance, determines the command value corresponding to the selected control mode, and outputs the command value to a control mode/command determination part 121 via a communication switching part 120 of the motor control unit 14.

As shown in FIG. 9, the motor control unit 14 includes the control mode/command determination part 121, the storage part 102, the mode switching part 103, the voltage correction part 104, the slope limitation part 105, the switching part 106, the current limitation part 107, the motor driving part 108, the rotation speed calculation part 109, the rotation number control part 110, and the communication switching part 120.

The communication switching part 120 is disposed to be interposed between the superordinate control unit 20 and the control mode/command determination part 121, and when the communication with the superordinate control unit 20 is cut off due to disconnection, etc., the communication switching part 120 switches the communication circuit and outputs such switching signal to the control mode/command determination part 121, so that the control mode/command determination part 121 directly receives the detection information of the temperature sensor 5.

In a state of being able to receive the control command transmitted from the superordinate control unit 20, the control mode/command determination part 121 outputs the transmitted control command (command value) as is, and when receiving the switching signal of the communication switching part 120, the control mode/command determination part 121 operates like the control mode/command determination part 101.

That is, when the communication with the superordinate control unit 20 is cut off, the control mode/command determination part 121 selects the control mode, among the control modes, corresponding to the temperature T of the oil with reference to the information stored in advance in the storage part 102 based on the temperature T (° C.) of the oil as the detection information detected by the temperature sensor 5, determines the command value corresponding to the selected control mode, and outputs a signal relating to such information to the mode switching part 103.

Figure 10:
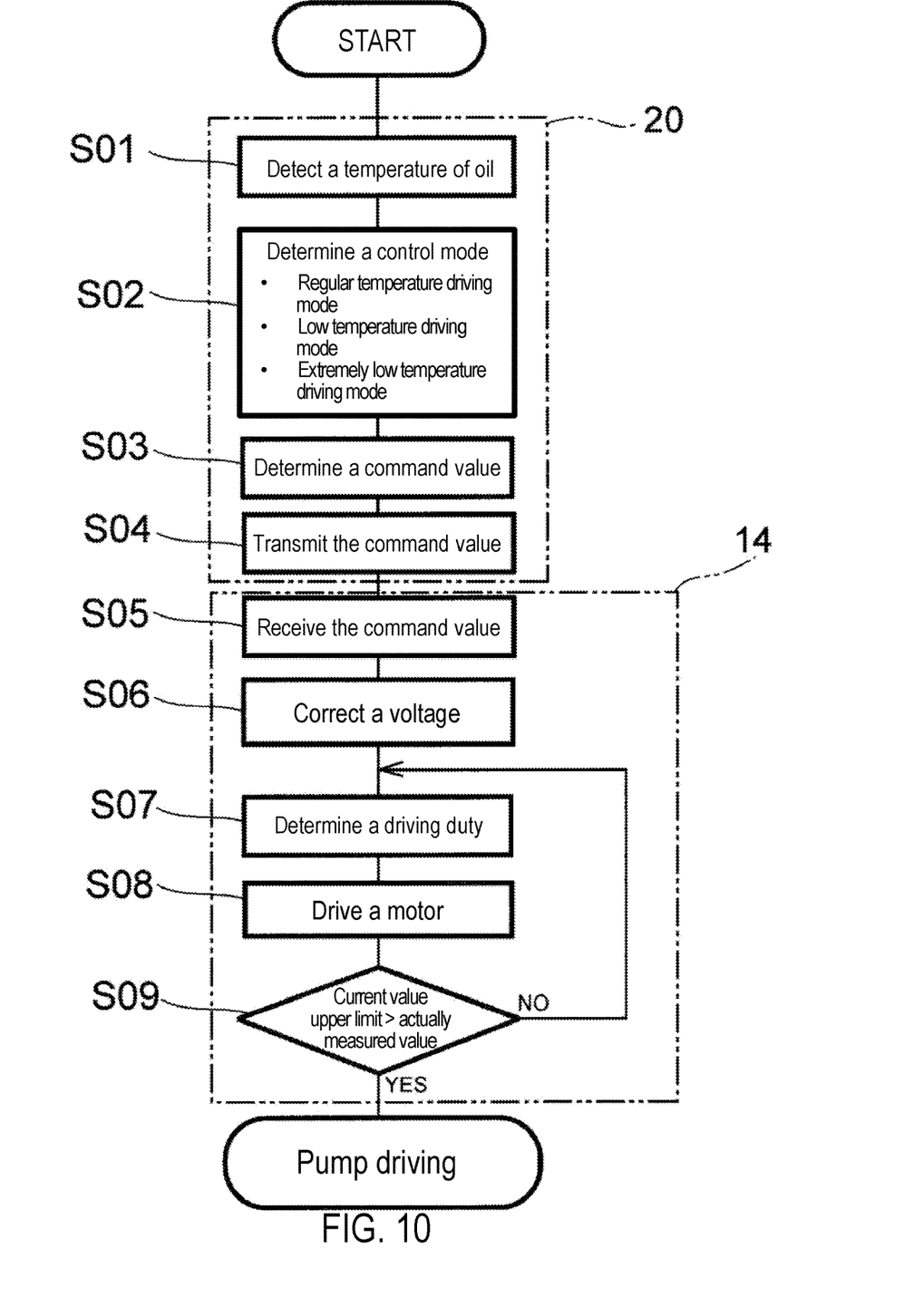
FIG. 10 is a flowchart illustrating a control sequence exerting driving control on a motor based on a control command of a superordinate control unit in the control system of the electric oil pump according to the another embodiment.
Figure 11:
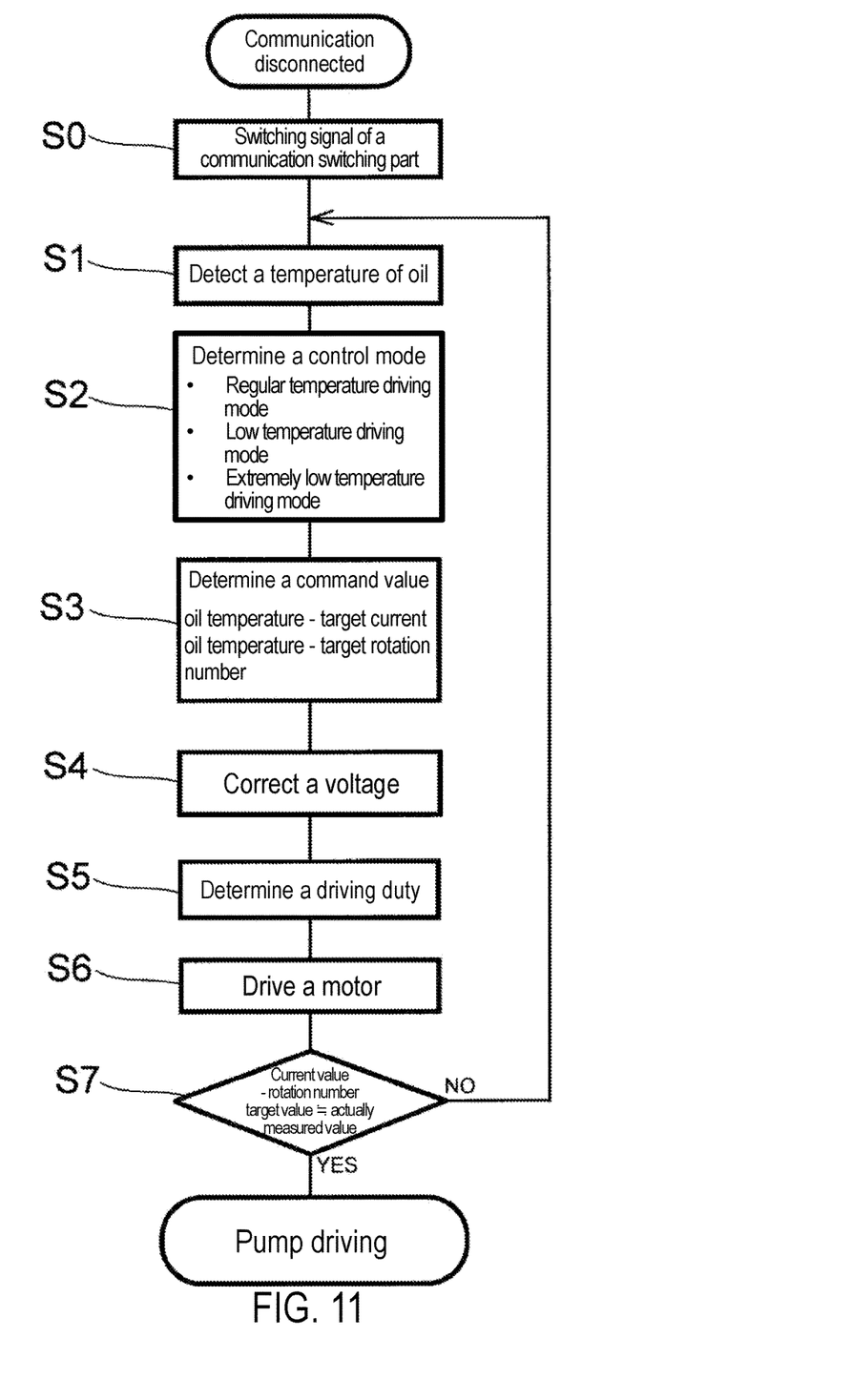
FIG. 11 is a flowchart illustrating a control sequence exerting driving control on the motor based on a command transmitted by a motor control unit when the communication of the superordinate control unit is cut off in the control system of the electric oil pump according to the another embodiment.

Then, the control operation of the electric oil pump OP with such configuration will be described based on the flowcharts shown in FIGS. 10 and 11. It is noted that the flowcharts shown in FIGS. 10 and 11 illustrate the overall operation schematically. FIG. 10 illustrates a control sequence when it is possible to receive the control information of the superordinate control unit 20, and FIG. 11 illustrates a control sequence when the communication with the superordinate control unit 20 is cut off.

Firstly, in the state where it is possible to receive the control information of the superordinate control unit 20, in Step S01, the temperature sensor 5 detects the temperature of the oil, and the superordinate control unit 20 receives the detection information.

Then, in Step S02, the superordinate control unit 20 determines the control mode corresponding to the information of the detected temperature. That is, when the temperature T of the oil is higher than the temperature A set in advance, the regular temperature driving mode is selected, when the temperature T of the oil is in the range of the temperature A to the temperature B set in advance, the low temperature driving mode is selected, and when the temperature T of the oil is lower than the temperature B, the extremely low temperature mode is selected.

Then, in Step S03, the superordinate control unit 20 determines the command value corresponding to the control mode determined in Step S02, and, in Step S04, transmits the command value as the command signal to the control mode/command determination part 121 via the communication switching part 120.

Steps until Step S04 are performed by the superordinate control unit 20, and steps since Step S05 are performed by the motor control unit 14 built in the electric oil pump OP. Then, in Step S05, when the control mode/command determination part 121 receives the command signal, the voltage is corrected in Step S06, and the driving duty is determined in Step S07.

Then, in Step S08, the motor 3 is driven based on the driving duty determined in Step S07.

Then, in Step S09, whether the actually measured current is less than an upper limit is determined. Here, when it is determined that the actually measured value is not less than the upper limit (NO), the flow returns to Step S07, and the sequence of Step S07 to Step S09 is repeated.

Meanwhile, when it is determined that the actually measured value is less than the upper limit (YES), the motor 3 rotation-drives the pump unit 2, that is, the pump driving continues.

Meanwhile, when the communication with the superordinate control unit 20 is cut off, as shown in FIG. 11, the control mode/command value determination part 121 receives the switching signal of the communication switching part 120 in Step S0. Then, the driving control of the motor 3 is carried out according to the control command of the motor control unit 14, instead of the control command of the superordinate control unit 20.

Firstly, in Step S1, the temperature sensor 5 detects the temperature of the oil, and the control mode/command determination part 121 receives the detection information. Then, in Step S2, the control mode is determined in accordance with the information of the detected temperature. That is, when the temperature T of the oil is higher than the temperature A set in advance, the regular temperature driving mode is selected, when the temperature T of the oil is in the range of the temperature A to the temperature B set in advance, the low temperature driving mode is selected, and when the temperature T of the oil is lower than the temperature B, the extremely low temperature mode is selected.

Figure 6:
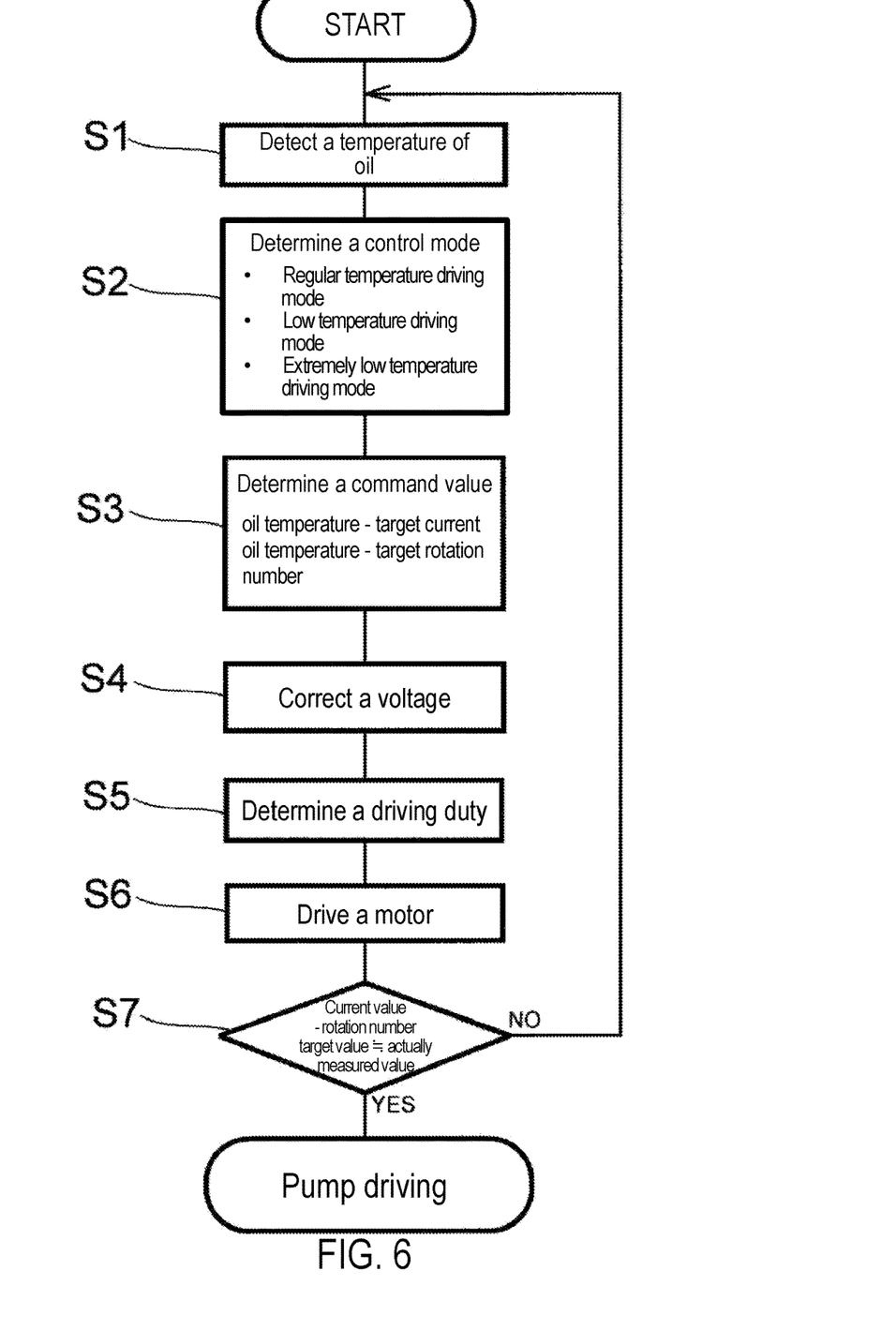
FIG. 6 is a flowchart illustrating a control sequence in the electric oil pump according to the embodiment.

Steps S3 to S7 are the same as those in the control sequence shown in FIG. 6, so the description thereof is omitted.

According to the control system of the electric oil pump according to the embodiment, the motor control unit 14 includes the communication switching part 120 which switches the communication circuit so as to directly receive the detection information of the temperature sensor 5 when the communication with the superordinate control unit 20 is cut off, and, based on the switching signal of the communication switching part 120, the motor control unit 14 directly receives the detection information of the temperature sensor 5 and exerts driving control on the motor 3 based on the detection information.

Therefore, even if the communication from the superordinate control unit 20 is interrupted, the motor control unit 14 built in the electric oil pump OP can directly receive the detection information of the temperature sensor 5 and exert driving control on the motor 3 based on the reception information. Therefore, the motor control unit 14 can stabilize the motor 3 and exert driving control, and can supply a desired amount of oil.

In the embodiments, in the case where the electric oil pump OP is applied to an application target, the motor control unit 4, 14 communicatably connected with the superordinate control unit 10, 20 mounted to the application target and built in the electric oil pump OP is configured to receive the start command from the superordinate control unit 10 and receive the control command from the superordinate control unit 20. However, the invention is not limited thereto.

For example, it may also be configured that, when the electric oil pump OP is applied to an application target, without communication with the superordinate control unit, the motor control unit built in the electric oil motor OP is started to perform driving control on the motor by turning on the power.

In the above embodiments, a brushless DC motor with a sensor is adopted as the motor. However, the invention is not limited thereto, and another type of motors may also be used. It may also be that a sensor-less, brushless DC motor including a circuit detecting an induction voltage that occurs at the time of phase switching is adopted, and in the motor driving control, a process that detects the induction voltage that occurs in coils due to the rotation of the motor, and exerts control based on the timing (zero cross point) when the value thereof reaches ½ of the driving voltage may be adopted.

In the above embodiments, the temperature sensor 5 is configured inside the housing 1 of the electric oil pump OP. However, the invention is not limited thereto. It may also be configured that, when the motor control unit built in the electric oil pump OP directly receives the detection information of the temperature sensor and performs driving control on the motor based on the detection information, the temperature sensor is disposed in the oil tank or another place as in the conventional art.

In the above embodiments, the pump unit included in the electric oil pump OP is exemplified as a trochoid type pump unit. However, the invention is not limited thereto. In the case of being rotation-driven by a motor, a pump unit of another configuration or another mode of action may also be adopted.

As described above, in the electric oil pump and the control system thereof according to the embodiments of the invention, by directly receiving the detection information of the temperature sensor detecting the temperature of the oil, the electric oil pump can independently exert pump driving control on its own, or can exert pump driving control even if the command signal from the superordinate controller is interrupted, and can supply a desired amount of oil. Therefore, in addition to being applicable to a transmission of a vehicle, an inverter of a hybrid vehicle, etc., the electric oil pump and the control system thereof according to the embodiments of the invention are also useful in an apparatus that requires supply of hydraulic oil or cooling oil.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control system of an electric oil pump, the control system comprising: an electric oil pump, comprising: a pump unit, rotating to make oil flow; a motor, driving the pump unit; a motor control unit, exerting driving control on the motor; and a housing, accommodating the pump unit, the motor, and the motor control unit; and
a superordinate control unit, mounted to an application target to which the electric oil pump is applied, directly receiving detection information of a temperature sensor detecting a temperature of the oil, and communicating with the motor control unit to transmit a control command to the motor control unit based on the detection information,
wherein the motor control unit comprises a communication switching part that switches a communication circuit to directly receive the detection information of the temperature sensor when communication with the superordinate control unit is cut off, directly receives the detection information of the temperature sensor based on a switching signal of the communication switching part, and exerts driving control on the motor based on the detection information.

2. The control system as claimed in claim 1, wherein the temperature sensor is disposed inside the housing to detect the temperature of the oil in a vicinity region of the pump unit.

3. The control system as claimed in claim 2, wherein the motor control unit comprises a storage part storing information of a plurality of control modes set in correspondence with the detection information of the temperature sensor and command values corresponding to the control modes.

4. The control system as claimed in claim 3, wherein the command value comprises a target current and a target rotation number corresponding to the detection information of the temperature sensor.

5. The control system as claimed in claim 4, wherein the motor control unit directly receives a feedback signal of an actually measured current of the motor and an actually measured rotation number of the motor and exerts driving control on the motor based on the feedback signal.

* * * * *